Figure 1:
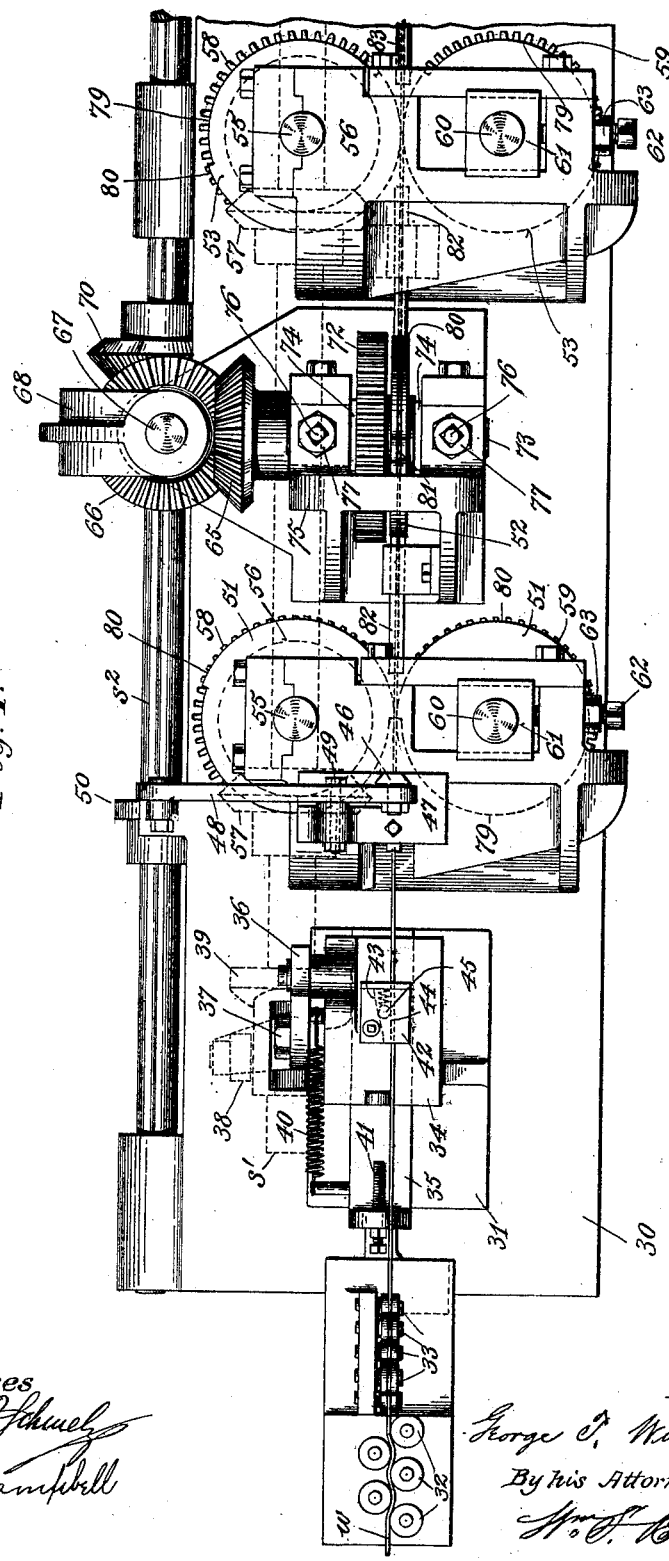

No. 690,088. Patented Dec. 31, 1901.
G. T. WARWICK.
MACHINE FOR SCREW THREADING, HEADING, AND ELONGATING METALLIC RODS.
(Application filed Mar. 25, 1901.)
(No Model.) 9 Sheets—Sheet 1.

Witnesses
Chas. P. Schmelz
M. A. Campbell

Inventor:
George T. Warwick
By his Attorney,
Wm. T. Bellens

No. 690,088. Patented Dec. 31, 1901.
G. T. WARWICK.
MACHINE FOR SCREW THREADING, HEADING, AND ELONGATING METALLIC RODS.
(Application filed Mar. 25, 1901.)
(No Model.) 9 Sheets—Sheet 2.

Witnesses
Chas. F. Schuely
M. A. Campbell

Inventor
George T. Warwick,
By his Attorney
Wm. F. Bellows.

No. 690,088. Patented Dec. 31, 1901.
G. T. WARWICK.
MACHINE FOR SCREW THREADING, HEADING, AND ELONGATING METALLIC RODS.
(Application filed Mar. 25, 1901.)
(No Model.) 9 Sheets—Sheet 3.

No. 690,088. Patented Dec. 31, 1901.
G. T. WARWICK.
MACHINE FOR SCREW THREADING, HEADING, AND ELONGATING METALLIC RODS.
(Application filed Mar. 25, 1901.)
(No Model.) 9 Sheets—Sheet 5.

Witnesses
Chas. F. Schuly
M. A. Campbell

Inventor
George T. Warwick,
By his Attorney
W. F. Bellers

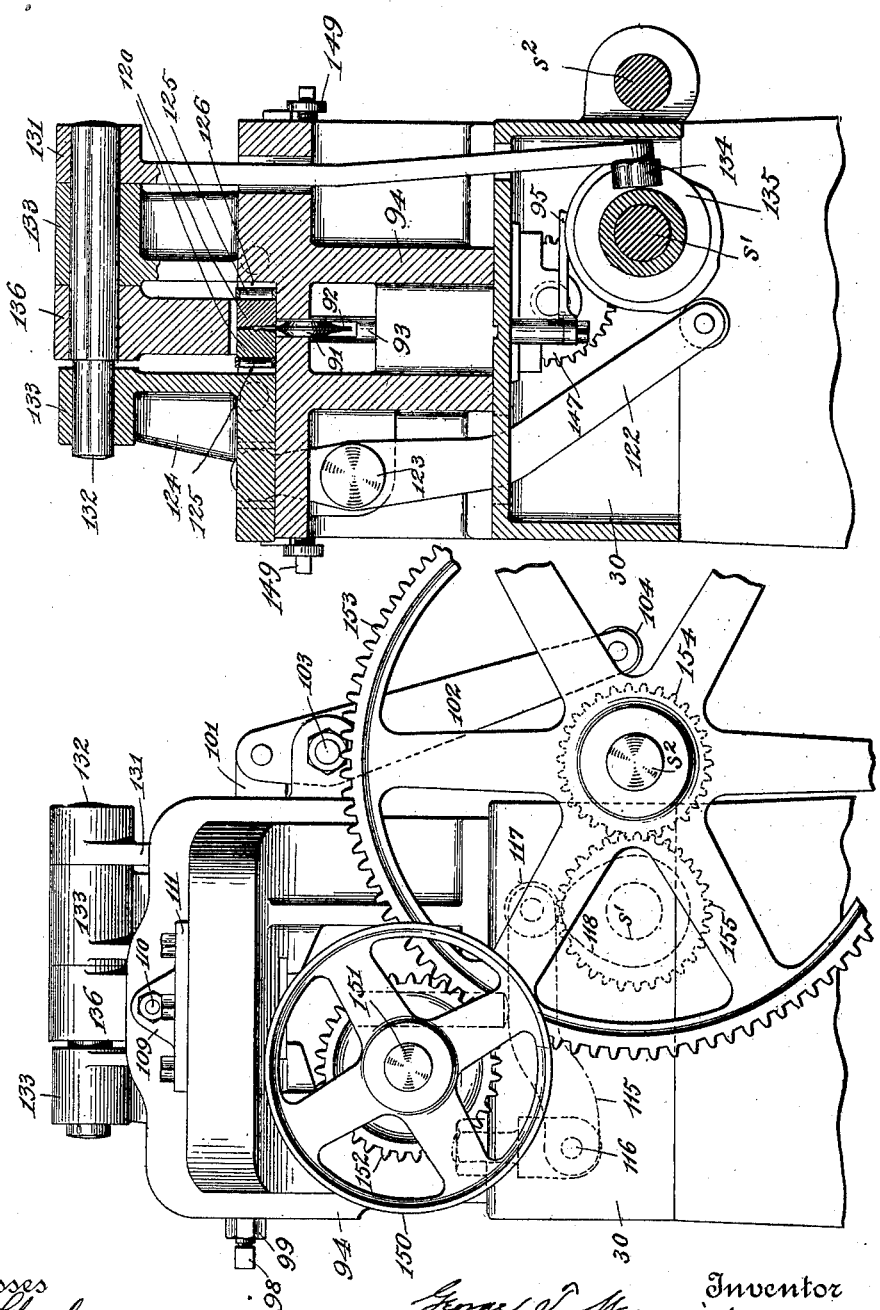

No. 690,088. Patented Dec. 31, 1901.
G. T. WARWICK.
MACHINE FOR SCREW THREADING, HEADING, AND ELONGATING METALLIC RODS.
(Application filed Mar. 25, 1901.)
(No Model.) 9 Sheets—Sheet 7.
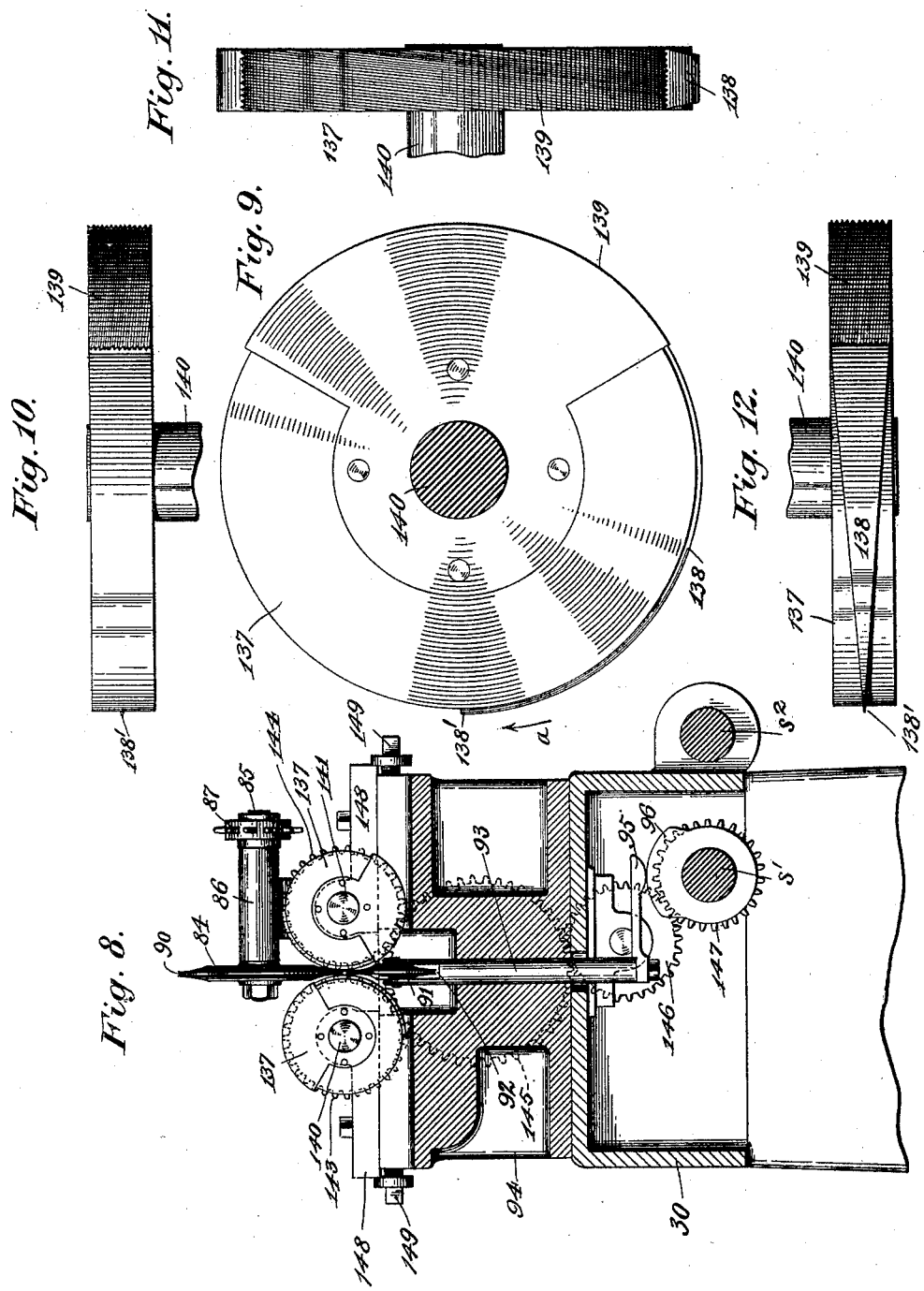

No. 690,088. Patented Dec. 31, 1901.
G. T. WARWICK.
MACHINE FOR SCREW THREADING, HEADING, AND ELONGATING METALLIC RODS.
(Application filed Mar. 25, 1901.)

(No Model.) 9 Sheets—Sheet 8.

Witnesses
Chas. P. Schmel
M. A. Campbell

Inventor
George T. Warwick,
By his Attorney
Wm. E. Bellows.

No. 690,088. Patented Dec. 31, 1901.
G. T. WARWICK.
MACHINE FOR SCREW THREADING, HEADING, AND ELONGATING METALLIC RODS.
(Application filed Mar. 25, 1901.)
(No Model.) 9 Sheets—Sheet 9.
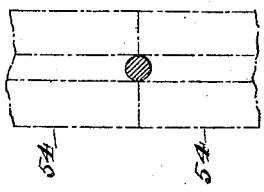
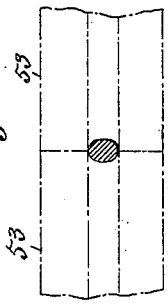
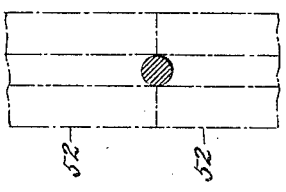
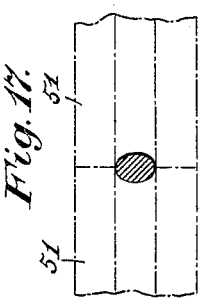

UNITED STATES PATENT OFFICE.

GEORGE T. WARWICK, OF SPRINGFIELD, MASSACHUSETTS.

MACHINE FOR SCREW-THREADING, HEADING, AND ELONGATING METALLIC RODS.

SPECIFICATION forming part of Letters Patent No. 690,088, dated December 31, 1901.

Application filed March 25, 1901. Serial No. 52,784. (No model.)

*To all whom it may concern:*

Be it known that I, GEORGE T. WARWICK, a subject of the King of Great Britain, and a resident of Springfield, in the county of Hampden and State of Massachusetts, have invented certain new and useful Improvements in Machines for Screw-Threading, Heading, and Elongating Metallic Rods, of which the following is a full, clear, and exact description.

This invention relates to metal-working machines, and has for its object the provision of an apparatus whereby wire spokes especially may be manufactured from wire which may be supplied to said apparatus from a spool.

It is the particular aim of my invention to provide a machine whereby spokes of the above-described character may be turned out complete—viz., one end of the blank upset to form a head and the main body portion of the blank somewhat reduced in size, while the other end of said blank is retained in its original form, but is provided with a screw-thread, so that the spokes after leaving the machine will be ready for use in assembling wheels for bicycles, &c.

My invention has for one of its objects the provision of means in connection with a machine of this character whereby the wire as it comes from a suitable wheel may after passing a series of threading devices be severed into blanks of predetermined length and in combination therewith of means whereby the body portion of the blank may be somewhat reduced, this reduction being accomplished by rolling down and in this way compressing and therefore hardening the grain of the metal.

My invention includes as one of its features a series of progressively-effective reducing-rollers, each coöperative pair of which have certain portions of their periphery cut away, so that only a part of their rotation will be employed for reducing the body of the blank, while the spaces or cut-away portions of the rollers will permit the end portions of the blank, which primarily are not acted upon, to pass said rolls without in any way altering their form.

My invention includes, furthermore, as one of its features in connection with the reducing-rollers a gradual diminution or decrease in cross-sectional area of the body portion of the blank in successive stages, the several progressively-effective reducing-rollers acting upon the wire so as to flatten the original cross-section of the blank to some extent and transforming it from a round into an oval form, the next succeeding pair of reducing-rollers again changing the oval form into a round, but of somewhat smaller diameter than the preceding one, this decreasing in area taking place gradually and until the blank has been reduced to the required size.

My invention has, furthermore, for its object the provision of a mechanism whereby the forward end of the blank may be upset to form a head such as is usual in wire spokes, this mechanism comprising as one of its component elements a clamping member whereby the end of the blank will be firmly held while a movable member of said heading mechanism will be forced against the blank end projecting beyond the clamping member, the movable member being limited in its backward and inoperative movement, so as to serve at the same time for a stop whereby the incoming blank may be properly positioned within the heading mechanism.

My invention has, furthermore, for its object a device whereby the blank after it has passed the reducing-rollers will be frictionally engaged and carried into position in the heading mechanism, the travel of the blank during this time being accelerated over its normal movement.

A further object of my invention may be found in a device whereby the blank after being headed may be slightly drawn out sufficiently to straighten the grain, in this manner correcting any disfiguration or bend in its axial line, while at the same time this straightening device will serve as a means for stretching the blank between predetermined points, and thereby to position the same relatively to other mechanism whereby the spoke is to be completed.

A further object of my invention consists in the provision of means whereby the rear end of the blank may be threaded, these means comprising a pair of coacting rollers which are of such size diametrically as to include besides the threading-surface thereof a wire-reducing portion which becomes effective preparatory to the thread-rolling operation in reducing the afterward-threaded portion of the spoke somewhat in diameter, so that after the threading-rollers form the thread on the blank the outside diameter of said threads will be substantially the same as the blank in its original form, and without the increase in size resultant from the thread-rolling operation as performed heretofore.

Figure 2:
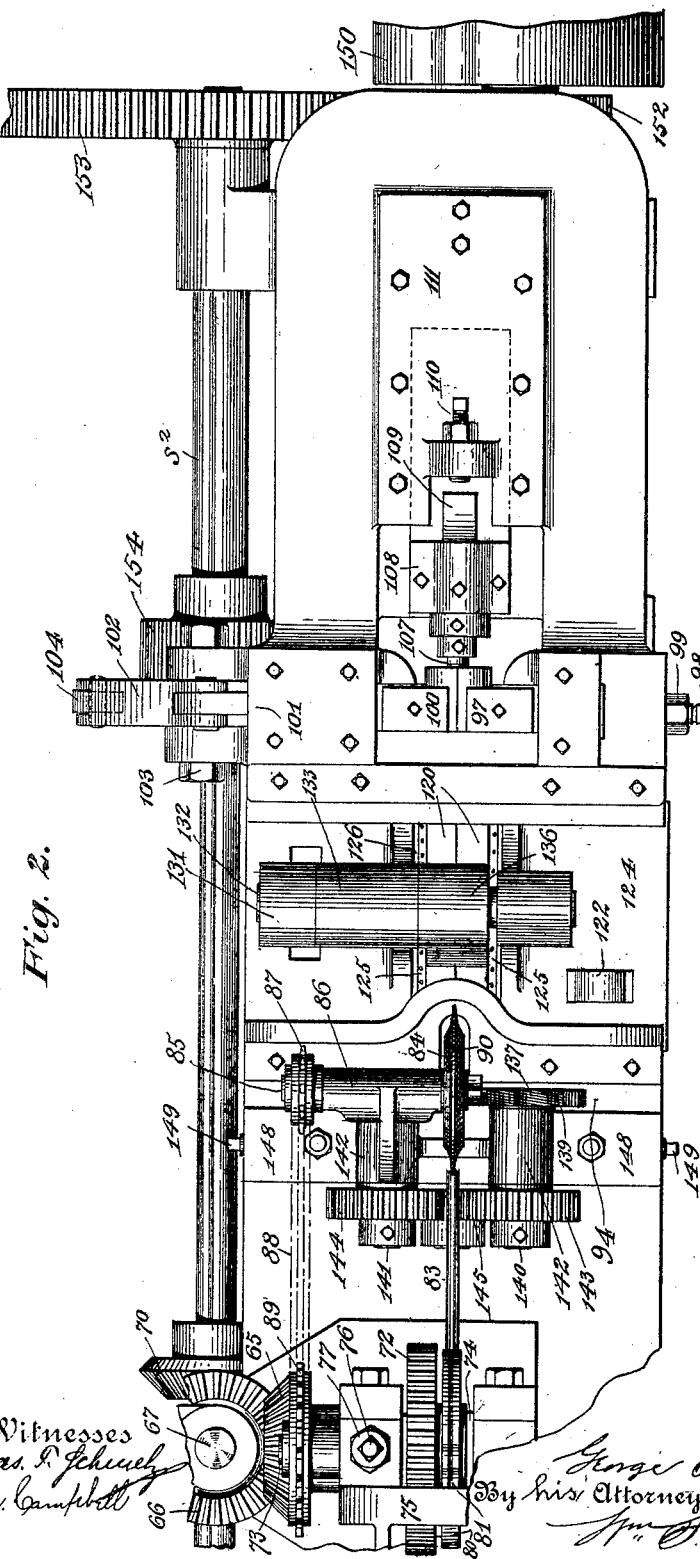
Figure 3:
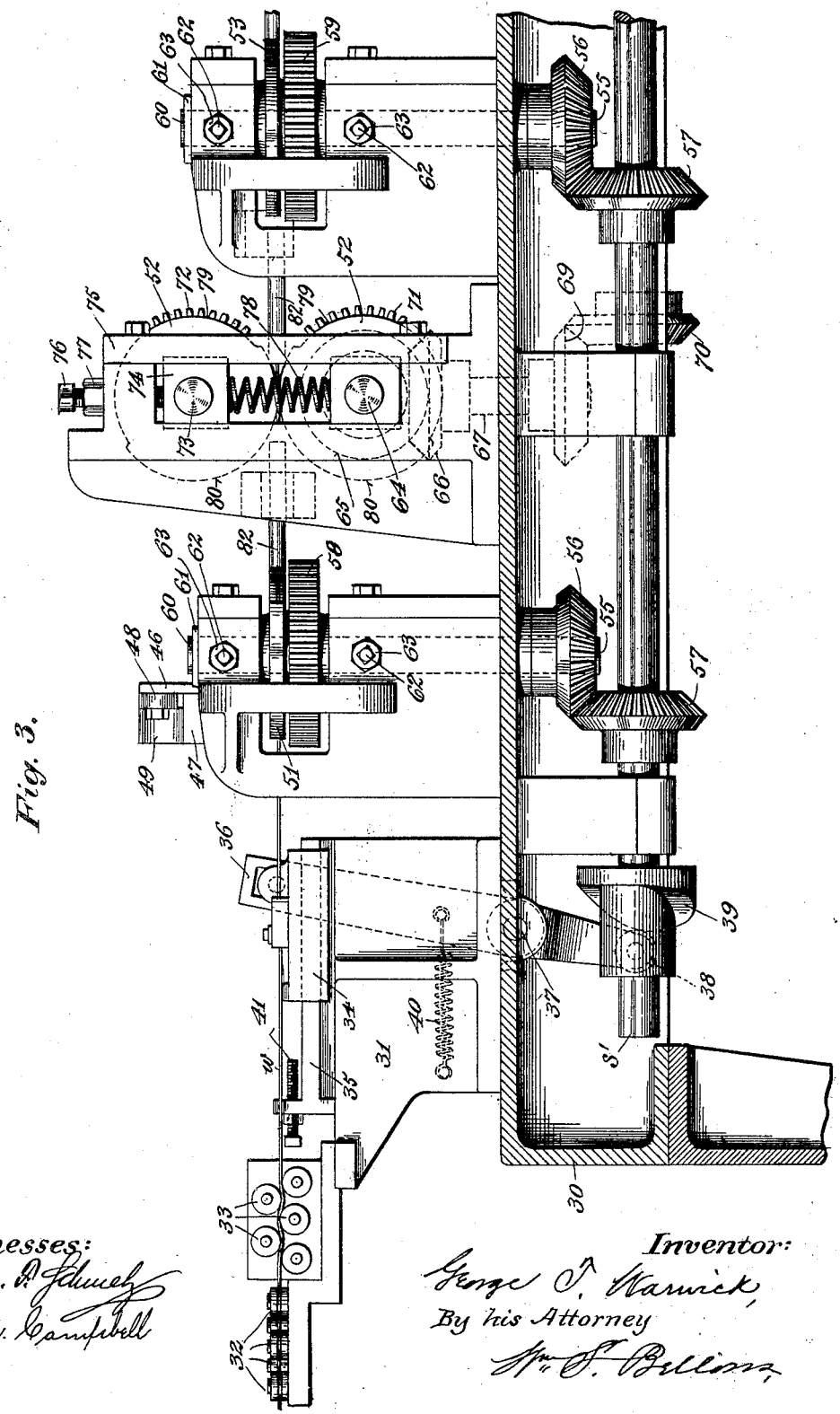
Figure 4:
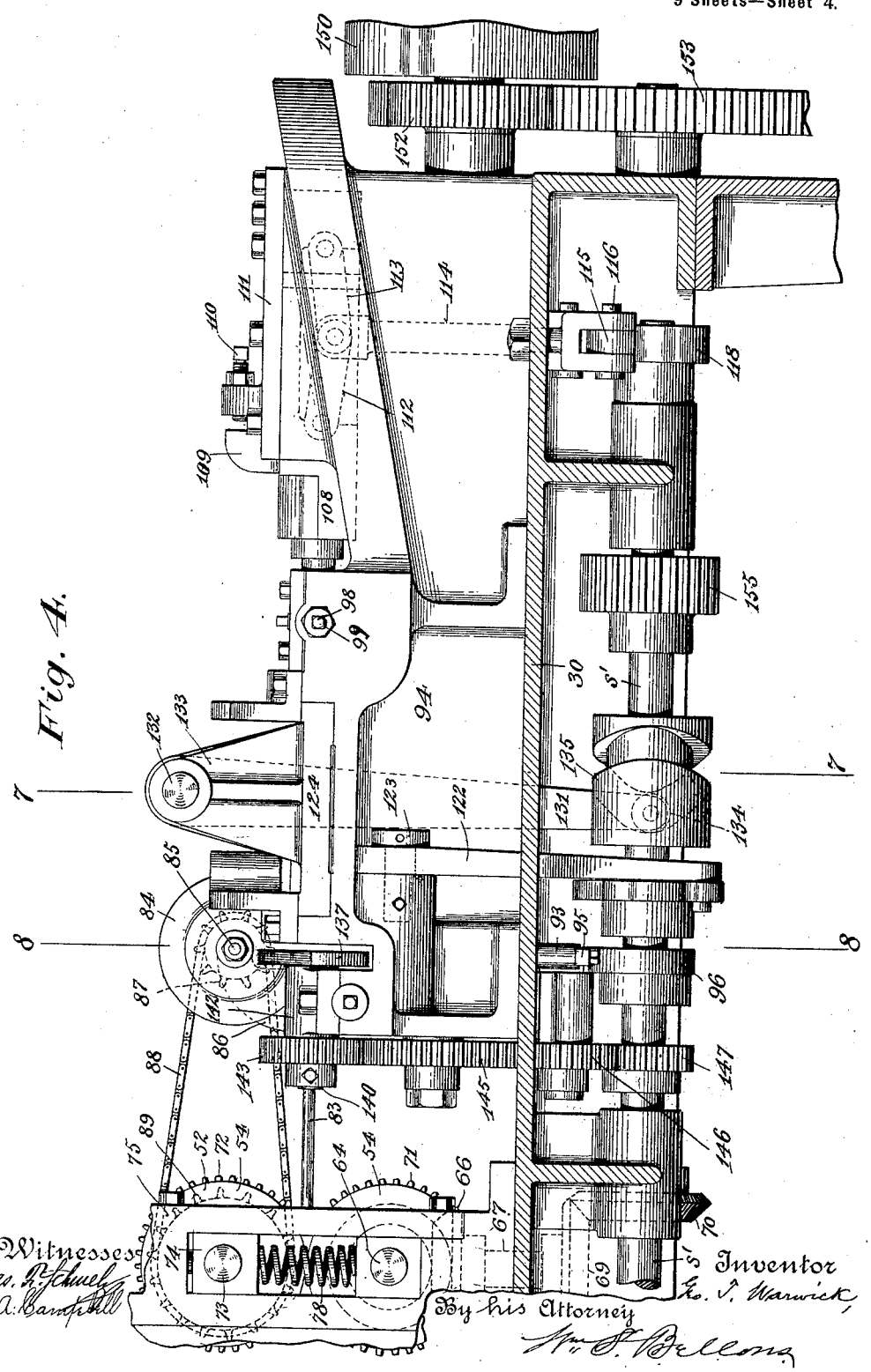
Figure 5:
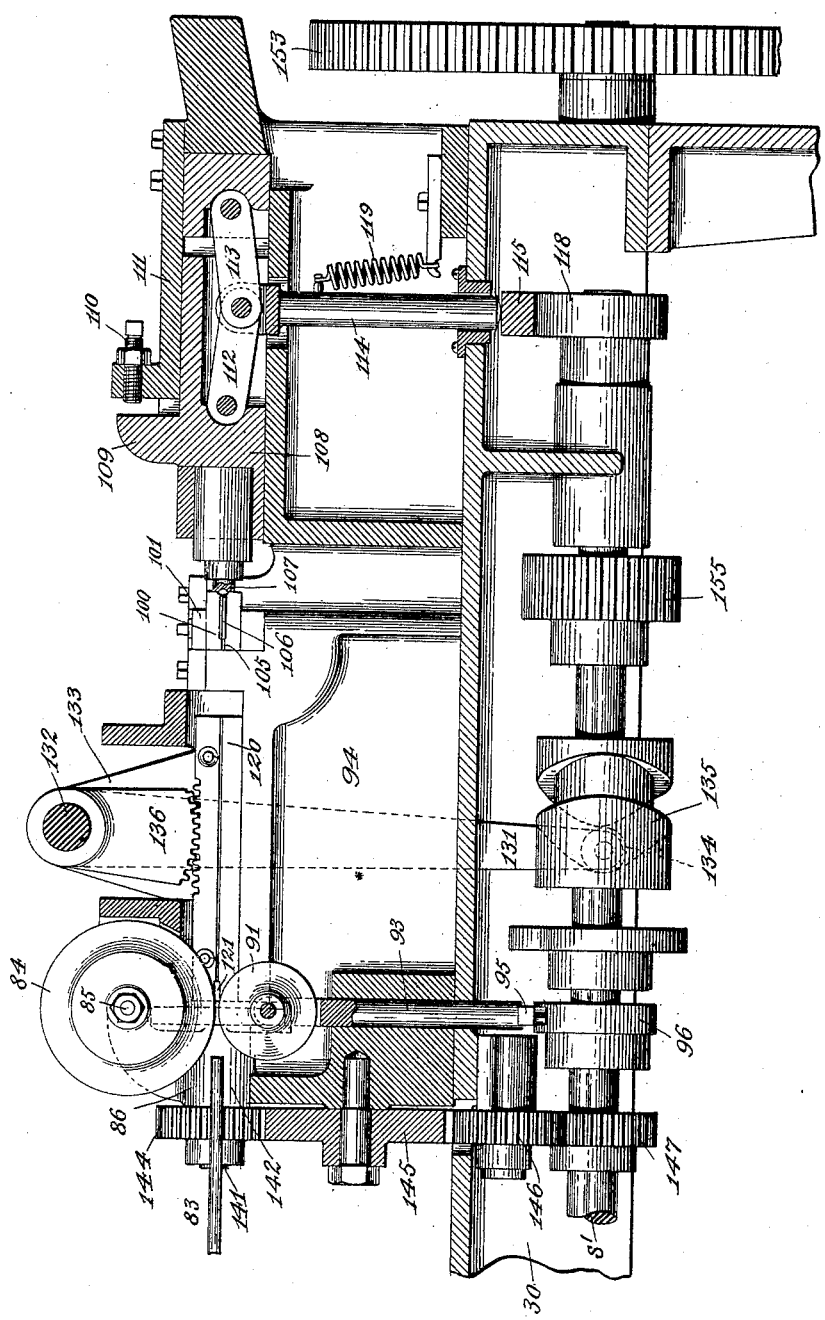
Figure 13:
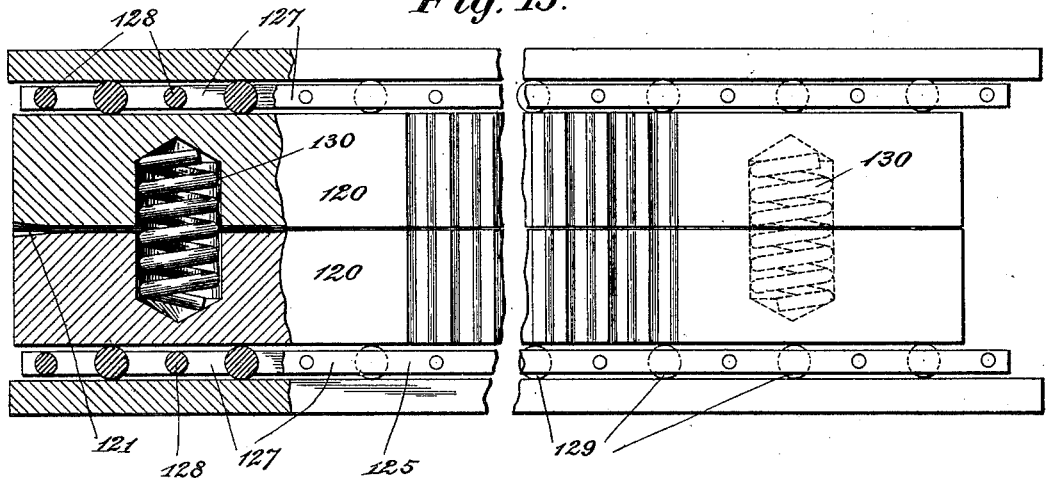
Figure 14:
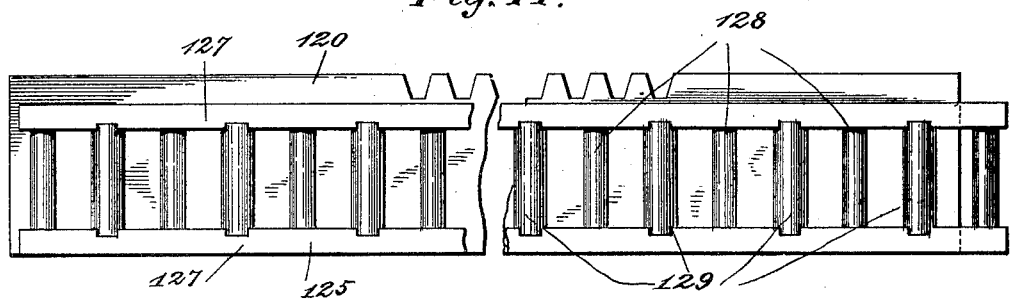
Figure 15:
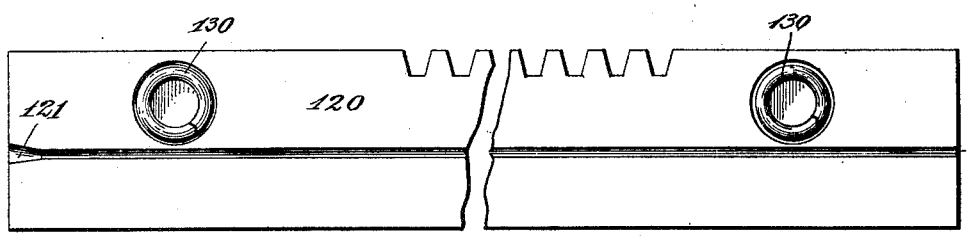

In the accompanying drawings, in which similar characters denote similar parts, Figures 1 and 2 in combination illustrate a top view of a machine built in accordance with my invention. Figs. 3 and 4 in combination show a side view thereof, a front side of the bed being broken away to disclose the interior. Fig. 5 shows a central longitudinal section of that part of my improved machine which contains the heading mechanism and the thread-rolling devices. Fig. 6 is an end view of the machine looking from the right of Fig. 4. Fig. 7 is a vertical cross-section taken on line 7 7 of Fig. 4. Fig. 8 is a vertical cross-section taken on line 8 8 of Fig. 4. Figs. 9 to 12, inclusive, are detail views of one of my impoved threading-rollers. Figs. 13, 14, and 15 are details of the straightening device, Fig. 13 being a top view, partly broken away, and Fig. 14 a side view, and Fig. 15 being a side view of one of the two parts of which the straightening device is composed. Figs. 16 to 20, inclusive, illustrate the action of the reducing-rollers upon the body portion of the blank; and Figs. 21 to 23, inclusive, show the rear part of the blank in the several stages through which it passes while the thread is being formed thereon.

Referring to the drawings, 30 represents the bed, having at one end thereof a frame 31, on which a plurality of wire-straightening devices, such as 32 and 33, are supported. The wire $w$ passes after leaving said straightening devices into engagement with suitable feeding means, these feeding means comprising, substantially, a slide 34, which is movable on ways 35, provided on the frame 31, and to which movement is imparted by a lever 36, fulcrumed at 37 on the bed 30, and the lower end of which carries a roller 38, in engagement with a suitable cam 39 on a shaft $s'$ for throwing said lever forward, while a spring, such as 40, may be employed for returning said lever to its backward position and for keeping the roller 38 in contact with the cam, as will be readily understood. The backward movement of the slide 34 may be limited—as, for instance, by an adjusting-screw 41, serving as an abutment for said slide, so that in this manner the amount of wire to be fed may be regulated as desired. The wire $w$ may be fed frictionally—as, for instance, as more clearly shown in Fig. 1, in which 42 designates a projection formed on the slide 34 and having a pair of working faces 43 and 44, between which a spring-actuated roll, such as 45, may impinge said wire $w$ against the working face 44, so that when the slide 34 travels forward (viz., from left to right, as seen in Fig. 1) said wire will be drawn forward, while, on the other hand, when the slide travels from right to left said roll will yield, and therefore not disturb the wire during its return trip. From the feeding mechanism the wire is conducted to a device whereby blanks of predetermined length are severed, this device being of any suitable construction and comprising in this instance a knife 46, mounted for vertical movement in a frame 47 and operated by a lever 48, fulcrumed at 49 and operated by a cam 50, mounted upon a shaft $s^2$, which is journaled in suitable bearings within the bed 30. After being cut off from the wire the blank will be brought into contact with means whereby the diametrical area of the body portion of the blank will be reduced to the desired extent, while at the same time the front and rear end of the blank will not in any way be altered. These means are herein shown as a series of successively progressively effective reducing-rollers, the several pairs of which are herein designated by 51, 52, 53, and 54 and the construction of which is substantially the same, so that the description of one pair will apply equally to the other. One of each pair of reducing-rollers 51 and 53 is mounted upon a vertical shaft 55, to the lower end of which is secured a bevel-gear 56, meshing with a similar gear 57, which is secured to the shaft $s'$, above mentioned. The shaft 55 carries also a gear 58, engaging a similar gear 59, mounted upon a companion shaft 60, preferably journaled in movable bearings 61, which are adjustable relatively to the shaft 55 and may be held in adjusted position—as, for instance, by means of a screw 62 and check-nut 63. Each lower one of the vertically-disposed pairs of reducing-rolls 52 and 54 is mounted upon a shaft 64, having at one end thereof a bevel-gear 65, in engagement with a similar bevel-gear 66, secured upon a shaft 67, which is journaled in a suitable framework, such as 68, and carries at its lower extremity a bevel-gear 69, in engagement with a similar bevel-gear 70 on the shaft $s^2$, above referred to, and each of the shafts 64 is also provided with a gear 71, in mesh with a similar gear 72, mounted on the upper shaft 73, which constitutes the companion shaft for the lower roll-shaft 64 and which is journaled in movable bearings 74, vertically adjustable in an upright frame 75—as, for instance, by means of a screw 76 and a check-nut 77—while a spring, such as 78, may be employed for keeping the upper roll-shaft 73 in normally-raised position and away from the lower roll-shaft 64.

It will be noticed that each of the reducing-rollers is cut away for a portion of its periphery, as at 79, so that when the cut-away portions of each coacting pair of reducing-rollers are adjacent to each other the blank will not come in contact therewith, while, on the other hand, when the working portions 80 of said reducing-rollers are rolling together the cross-section of the blank-body will be rolled out subject to the depth of the groove 81 provided in said working portion.

Means are provided whereby the blank after it leaves one pair of reducing-rollers will be guided into position to be engaged by the next succeeding pair, these means consisting, substantially, of tubular guides 82, interposed between the several pairs of reducing-rollers. From the last set of reducing-rollers 54 the wire is conducted through a tubular guide 83 to a device whereby the blank is frictionally engaged and propelled forward under accelerated speed and to be positioned to be acted upon by other mechanism to be hereinafter described. This device constitutes a transferring device, and comprises in the present instance a roller 84, which is mounted upon a spindle 85, journaled in a bracket 86 and having at one end thereof a sprocket-wheel which is connected by a chain 88 with another sprocket-wheel 89, mounted upon the upper shaft 73 of the last set of reducing-rollers 54. The roller 84 is made substantially in the form of a disk having a peripheral groove 90 for engaging the top of the blank, while a companion roller, such as 91, also made in form of a disk and having a peripheral groove 92, will engage the under side of the blank. The lower roller 91 is preferably journaled in a cylindrical slide 93, mounted for vertical movement in the base 94 and having secured to its lower end a resilient member 95, adapted to be engaged to elevate said roller, so as to engage the blank—as, for instance, by means of a cam 96, which is mounted upon the shaft $s'$, above mentioned.

The wire blank will be propelled forward by the rollers 84 and 91 until it is properly positioned in and relative to the heading mechanism, whereby the end of said blank will be upset to form a head. This mechanism comprises, in the preferred form thereof shown, a clamping member consisting of a fixed jaw 97, which is adjustably held on the base 94—as, for instance, by a screw 98 and a check-nut 99—said fixed jaw being mounted for sliding movement laterally of said base, so as to be adapted for adjustment for wires of different diameters. Coöperating with the fixed jaw 97 is a movable jaw 100, mounted for reciprocation on the base 94—as, for instance, by a slide 101—the outer end of which may be engaged by the upper end of a bifurcated lever 102, which is fulcrumed at 103, and the lower end of which carries a roller 104, in engagement with a suitable cam mounted upon the shaft $s^2$, above mentioned. Both of the jaws 97 and 100 may be provided with a longitudinal groove 105, which in the present instance is enlarged at its forward end, as shown at 106, (see Fig. 5,) to engage the forward enlarged end of the blank, and thus hold the same firmly while the head is being formed thereon. Referring more especially to Figs. 2 and 5, it will be seen that the heading-die 107 is held in a slide 108, mounted for reciprocation on the base 94 and having on its upper surface a projection 109, adapted to strike a movement-limiting screw 110, adjustably held in the covering-plate 111, whereby the slide is guided. Any suitable means may be employed for imparting movement to the slide 108, the mechanism shown in the accompanying drawings consisting, substantially, of the toggle-arms 112 and 113, pivoted with their ends to the slide and the base 94, respectively, while said arms are operated by a thrust-rod 114, the lower end of which may be in engagement with a lever 115, which is journaled at 116 at the bed-casting 30, said pivot being preferably mounted for adjustment, as clearly indicated in Fig. 6, so that the effective travel of the thrust-rod 114 may be positioned as desired. The outer end of the lever 115 is herein shown as carrying a roller 117, in engagement with a suitable cam 118, which is mounted on the shaft $s'$ and is so timed as to give proper forward movement to the slide 108, while a spring, such as 119, may be employed for retracting the slide 108 after the heading-die has accomplished its work.

After having been headed the blank may be subjected to the means whereby said blank is provided with a screw-thread. This mechanism, which will be described more fully hereinafter, necessitates to a certain degree the proper positioning of that portion of the blank which is to be screw-threaded relatively thereto, the means employed in this instance serving at the same time for straightening the wire by imparting a slight stretch to the blank, sufficient perfectly to straighten the same and at the same time bring the end of the blank into proper position relative to the threading mechanism. This straightening device comprises, preferably, a slide 120, adapted for gripping the blank near the rear end thereof and having a recess 121, in which the enlarged portion of the blank may be received, so that by the movement of said slide from right to left the blank may be straightened and stretched out to the required extent. The slide 120 is herein shown as a two-part member, both parts of which are provided at their line of separation with a groove adapted to receive the body portion of the blank, and means are provided whereby the parts of said member are forced together, so as to frictionally engage the blank during the stretching or straightening operation, these means consisting, substantially, of a lever 122, (see Fig. 7,) fulcrumed at 123 on the base 94 and having its upper end in engagement with a slide 124, which is mounted for crosswise movement on the base 94 and the inner end of which serves as a bearing-face for an antifriction device disposed between slide 124 and the slide 120 on one side thereof, while a similar antifriction device is disposed between the other side of the straightening-slide 120 and an adjustable abutment 126, so that by these means the laterally-stationary member of the slide 120 may be properly positioned in alinement with the longitudinal axis of the blank. The antifriction device above referred to is more clearly illustrated in Figs. 13 and 14 of the drawings, in which 127 designates a pair of superposed bearings properly distanced by a plurality of posts 128 and having journaled in them a number of rollers 129, the device as a whole being movable longitudinally as the straightening-slide is operated in either direction.

Means are provided whereby the two parts of the slide 120 are normally separated as soon as the lever 122 will have caused a release of the laterally-movable part of said slide and for the purpose of permitting the blank after it has been straightened to the required extent to be discharged from said slide, these means consisting in the present instance of springs 130, seated in recesses provided therefor within said slides, said springs being as a matter of course disposed above the blank or the groove for containing the same, as is shown in Fig. 15.

The mechanism imparting a reciprocatory movement of the slide 120 is herein shown as comprising a lever 131, secured at its upper end on a shaft 132, which is journaled in bearings 133, provided on the base 134, while its lower end carries a roller in engagement with a suitable cam 135, mounted upon the shaft $s'$. Mounted upon the shaft 132, between the bearings 133, is a sector 136, the teeth of which are of sufficient width to engage similar gear-teeth provided on both of the parts of the slide 120, so that in this manner the slide will have a predetermined movement and will therefore position the rear end of the blank properly relatively to the threading mechanism, which constitutes another feature of my invention.

As has above been stated, it is one object of my invention to provide means whereby a blank or a spoke-blank may be provided with screw-threads, said threads being in this instance rolled on said blank instead of being cut, and the device whereby said rolling operation is performed is more clearly shown in Figs. 9 to 12, inclusive. Referring first to Fig. 8, it will be seen that I employ a pair of coöperative rollers 137, the construction of which is substantially alike, so that the description of one will answer for both.

It is a well-known fact that when threads are rolled onto a metal blank the diameter of such blank will be increased beyond its normal size by virtue of the crowding action whereby the metal is displaced during the rolling operation, such displacement being generally effective in such a way that the depression which is caused by the rolling-dies in the metal will produce a similar increase of "addendum" to the outside diameter, so that under ordinary circumstances the outside diameter of the thread will be larger than the diameter of the wire originally was. In order to avoid this difficulty, I deem it preferable to provide means whereby that portion of the blank which is to be provided with the screw-thread shall be at first slightly reduced in diameter, so that after the thread-rolling operation has been completed the outside diameter of the thread will not have been increased beyond the original size of the blank-wire at that point. In Fig. 9 of the drawings it will be seen that the periphery of the reducing and threading roller is divided into three sections—first, a wire-reducing section; second, a threading-section, and, third, a blank or non-effective section, the latter named of which will permit the blank being passed between said rollers without being engaged thereby and without the necessity of moving either one or both of said rollers to permit such passage. The reducing-section (denoted by 138) becomes effective on the blank in a peculiar manner, its form being wedge-shaped, so that the point 138' thereof will force its way into the body of the wire, and the rotation of the roller in the direction of arrow $a$ will result in gradually elongating the section acted upon until the end of the wedge has finally come into contact with the wire, the latter being at this time reduced to the required diameter. The second section, 139, whereby the threads are to be rolled on the blank, will now roll a thread on the reduced blank, the pitch of the die-thread corresponding, of course, to the thread to be rolled on said blank.

The rollers 137 are mounted upon spindles 140 and 141, respectively, such spindles being journaled in bearings 142 and having at their other ends gears 143 and 144, respectively, both of which are in engagement with an intermediate 145, journaled on the base 94, and which is in turn rotated by another intermediate 146, in mesh with a pinion 147, mounted on the shaft $s'$, so that through this train of gears said threading-rollers 137 will be continuously rotated by the movement of the shaft $s'$. The bearings 142 are formed on slides 148, which are mounted for adjustment relatively to each other—as, for instance, by adjusting-screws 149—whereby the distance between said rollers, and therefore their action upon the blank, may be regulated as desired.

The operation of my improved machine is as follows: Rotary movement is imparted to a pulley 150, loosely mounted on a stud 151 and carrying a pinion 152, in engagement with a gear 153, which is secured near the end of the shaft $s^2$, which in turn carries a gear 154, in mesh with a similar gear 155, mounted on the shaft $s'$, the train of gearing just described being effective in rotating the shafts $s'$ and $s^2$ in opposite directions, and thus operating the various devices mounted on said shafts in the proper manner. Wire is introduced into the machine and passed between the sets of straightening-rolls 32 and 33, thence through the feed-slide 34 between the roller 45 and the working face 43, thence past the knife 46 and between the first set of reducing-rollers 51. As the slide 34 is now reciprocated the wire will be fed forward and into contact with the second set of reducing-rollers 52 through the guide-tubes between the several sets of reducing-rollers and into position between the third set of reducing-rollers and thence into contact with the last set of reducing-rollers 54, the several sets of reducing-rollers being effective upon the wire in reducing the body portion thereof in the manner as shown in Figs. 17 to 20, inclusive, so that the normal size of the wire is maintained at both ends of the blank and will therefore form head portions for said blank, as will be readily understood. The spoke-blank will now be moved forward by the transferring device, which consists of the rollers 84 and 91, until the front end of said blank is properly positioned between the fixed and movable jaws 97 and 100, which will then grip the forward end of said blank, so that a small portion of the blank will project beyond said jaws. The heading-slide 108, with its die 107, is now caused to approach the end of the blank to upset it, and thus form a head thereon. At this time the two parts composing the straightening-slide 120 are forced together by the lever 122 to engage the rear portion of the blank, whereupon the cam 135 on the shaft s' will operate the sector 136 to move said straightening-slide from the right to the left, by which movement the grain of the blank is straightened and at the same time the rear end of the blank is brought into proper position relative to the threading devices, which at this time have their blank or non-effective peripheral portions adjacent to the blank, as soon as the slide 120 has arrived at its extreme movement to the left, and the threading-rollers 137 will at first engage the blank with their reducing-sections 138, whereupon the two parts of the straightening-slide are caused to release the blank and are then returned to their normal position to the right end of its movement. The heading-die having been withdrawn at this time, the rollers 137 will, after reducing the portion to be threaded to its proper size, roll a screw-thread thereon until the non-effective portions of said rollers will again be adjacent to the blank. The movable jaw 100 is now released from contact with the headed end of the blank and the latter may now drop out between the two parts of the straightening-slide and another blank will be propelled forward to take its place, when the operation will be repeated in the manner above described.

It is evident that numerous changes may be made in the particular construction and organization of the various parts and mechanisms comprising my improved machine, and therefore I wish it to be distinctly understood that I do not confine my invention to the particular construction of the several parts as herein shown and described.

Having described my invention, what I claim as new, and desire to secure by Letters Patent, is—

1. The combination, with a heading mechanism; of means for straightening a blank; and means for rolling a thread thereon.

2. The combination, with a heading mechanism, comprising a clamping member; and a heading-slide; of means for straightening the blank; and means for rolling a thread thereon.

3. The combination, with a heading mechanism, comprising a clamping member; a reciprocatory heading-slide; and a stop for limiting the backward movement of said slide; of means for straightening the blank; and means for rolling a thread thereon.

4. The combination, with a heading mechanism, comprising a clamping member; and a heading-slide; a stop for limiting the backward movement of the slide; and a cam-operated toggle mechanism for actuating said slide; of means for straightening the blank; and means for rolling a thread on said blank.

5. The combination, with a heading mechanism, comprising a clamping member; of a reciprocatory slide for gripping the blank near one end thereof, and for straightening said blank.

6. The combination, with a heading mechanism, comprising a clamping member, and a reciprocatory heading punch or die coöperating therewith; of a gripping-slide comprising separable members for holding a blank near one end thereof, and for frictionally engaging the body portion thereof, means for separating and approaching the slide members, and means for imparting thereto their longitudinal movements.

7. The combination, with a heading mechanism, comprising a clamping member; and a reciprocatory heading punch or die coöperating therewith; of a slide comprising separable members, having grooves for receiving the body portion of the blank, and having recesses corresponding to the head portion of said blank; means for separating and approaching the slide members, and means for reciprocating the slide.

8. The combination, with a heading mechanism, comprising a clamping member, and a reciprocating die coöperating therewith, of a two-part member for gripping the body of the blank near one end thereof; means for periodically forcing the parts of said member together, means for endwise moving said two-part member, and means for insuring a normal separation of the parts thereof.

9. The combination, with a heading mechanism, comprising a clamping member; of a two-part straightening member; means for normally separating the component parts of said member; and means for forcing said parts together.

10. The combination, with a heading mechanism, comprising a clamping member; of a two-part straightening member; springs for normally separating said parts; and means for forcing said parts together.

11. The combination, with a heading mechanism, comprising a clamping member; of a two-part straightening member, both parts of which have a groove for receiving the body of a blank; and having a recess corresponding to the head portion of said blank; springs disposed above the groove, and for normally separating the parts of said member; and means for forcing said parts together.

12. The combination, with a heading mechanism, comprising a clamping member; of a slide for gripping the blank near one end thereof, and for straightening the blank; and having gear-teeth at its upper face; and a sector in engagement with said teeth.

13. The combination, with a heading mechanism, comprising a clamping member; of a reciprocatory slide for gripping the blank near one end thereof, and for engaging the body portion thereof, said slide having gear-teeth at its upper face; and a cam-operated sector in engagement with said teeth.

14. The combination, with a heading mechanism, comprising a clamping member; of a two-part straightening member for gripping the blank near one end thereof; springs for normally separating the parts of said member; and a cam-operated slide for forcing said parts together.

15. The combination, with a heading mechanism; and with means for straightening the blank; of a pair of threading-rollers for rolling a thread on said blank.

16. The combination, with a heading mechanism; and with means for straightening a blank; of a pair of continually-rotating threading-rollers for rolling a thread on said blank.

17. The combination, with a heading mechanism; and with means for straightening the blank; of a pair of threading-rollers for rolling a thread on said blank; and means for varying the distance between said rollers.

18. The combination, with wire-feeding means; and with a cutting device for severing the wire into predetermined lengths; of a heading mechanism; and a blank-transferring device comprising members arranged to frictionally sidewise engage the blank for positioning the latter relatively to the heading mechanism.

19. The combination, with wire-feeding means; a cutting device for severing the wire into predetermined lengths; of a heading mechanism, comprising a clamping member; and a reciprocatory die coöperating therewith, and a reciprocatory slide; a stop for limiting the backward movement of the slide; and a blank-transferring device comprising members arranged at opposite sides of the path of the blank to frictionally sidewise engage the blank to position the blank relatively to said heading-slide.

20. The combination, with wire-feeding means; and with a cutting device for severing the wire into blanks of predetermined length; of a heading mechanism; a positively-driven roller; and a friction-roller coöperative therewith, for engaging and positioning the blank relatively to the heading mechanism.

21. The combination, with wire-feeding means; and with a cutting device for severing the wire into blanks of predetermined length; of a heading mechanism; a positively-driven roller; a friction-roller coöperative therewith, for engaging and positioning the blank relatively to the heading mechanism; a slide rotatably supporting said roller; and a cam for actuating said slide.

22. The combination, with wire-feeding means; and with a cutting device for severing the wire into blanks of predetermined length; of a heading mechanism; a positively-driven roller; a friction-roller coöperative therewith, for engaging and positioning the blank relatively to the heading mechanism; and a slide rotatably supporting said roller, and having a resilient member, and a cam for engaging said member and for actuating said slide.

23. The combination, with wire-feeding means; and with a cutting device for severing the wire into blanks of predetermined length; of a heading mechanism; and means for straightening the body portion of the blank.

24. The combination, with wire-feeding means; and with a cutting device therebeyond for severing the wire into blanks of predetermined length; of a pair of coacting rollers for reducing the body portion of a blank, located in line with and beyond both the feeding and severing devices, said rollers having cut-away portions which are non-effective upon the blank.

25. The combination, with wire-feeding means; and with a cutting device for severing the wire into blanks of predetermined length; of reducing means; and means for straightening the blank.

26. The combination, with wire-feeding means; and with a cutting device for severing the wire into blanks of predetermined length; of a pair of coacting rollers for reducing the body portion of said blank; and means for straightening the blank.

27. The combination, with wire-feeding means; and with a cutting device for severing the wire into blanks of predetermined length; of a pair of coacting rollers having cut-away portions, and for reducing the body portion of said blank; and means for straightening the blank.

28. The combination, with wire-feeding means; and with a cutting device for severing the wire into blanks of predetermined length; of a series of progressively-effective reducing-rollers, operative on the body portion of the blank; and means for straightening the blank.

29. The combination, with wire-feeding means; and with a cutting device for severing the wire into blanks of predetermined length; of reducing means operative upon the body portion of the blank; a heading mechanism for upsetting one end of the blank; and means for straightening the blank.

30. The combination, with wire-feeding means; and with a cutting device for severing the wire into blanks of predetermined length; of a heading mechanism for upsetting one end of said blank; a blank-transferring device for frictionally engaging and positioning the blank relatively to the heading mechanism; and means for straightening the blank.

31. The combination, with wire-feeding means; and with a cutting device for severing the wire into blanks of predetermined length; of a heading mechanism for upsetting one end of said blank; a blank-transferring device for frictionally engaging and positioning the blank relatively to the heading mechanism; means for straightening the blank; and means for rolling a thread on said blank.

32. The combination, with wire-feeding means; and a cutting device for severing the wire into blanks of predetermined length; of a heading mechanism; a blank-transferring device for frictionally engaging and positioning the blank relatively to said heading mechanism; a two-part member for gripping the blank near one end thereof; means for rolling a thread on said blank; means for forcing the parts of the two-part member together; and means for normally separating said parts.

33. The combination, with wire-feeding means; and with a cutting device for severing the wire into blanks of predetermined length; of a heading mechanism; means for straightening the blank; and means for rolling a thread on said blank.

34. The combination, with wire-feeding means; and with a cutting device for severing the wire into blanks of predetermined length; of a heading mechanism upsetting one end of the blank; a two-part member for gripping the blank near one end thereof; means for forcing the parts of said member together; a pair of threading-rollers for rolling a thread on said blank; and means for normally opening said two-part member.

35. The combination, with wire-feeding means; and with a cutting device for severing the wire into blanks of predetermined length; of blank-reducing means; a heading mechanism for upsetting one end of the blank; a transferring device for frictionally engaging and positioning the blank relatively to the heading mechanism; and means for straightening the blank.

36. The combination, with wire-feeding means; and with a cutting device for severing the wire into blanks of predetermined length; of blank-reducing means; a heading mechanism for upsetting one end of the blank; means for straightening the blank; and means for rolling the thread on said blank.

37. The combination, with wire-feeding means; and with a cutting device for severing the wire into blanks of predetermined length; of blank-reducing means; a heading mechanism for upsetting one end of the blank; a two-part member for gripping the blank near the upper end thereof; means for forcing the parts of said member together; a pair of threading-rollers for rolling a thread on said blank; and means for normally opening said two-part member.

38. The combination, with wire-feeding means; and with a cutting device for severing the wire into blanks of predetermined length; and a series of progressively-effective rollers for reducing the body portion of the blank; of a heading mechanism for upsetting one end of the blank, and comprising a clamping member; a transferring device for frictionally engaging and for positioning the blank relatively to the heading mechanism; means for straightening the blank; and means for rolling a thread on said blank.

39. The combination, with wire-feeding means; and with a cutting device for severing the wire into blanks of predetermined length; a series of progressively-effective rollers for reducing the body portion of the blank; of a heading mechanism for upsetting one end of the blank, and comprising a clamping member; a transferring device for frictionally engaging and for positioning the blank relatively to the heading mechanism; a gripping-slide for holding the blank near one end thereof, and for frictionally engaging the body portion of said blank; and means for rolling a thread on said blank.

40. The combination, with wire-feeding means; and with a cutting device for severing the wire into blanks of predetermined length; and a series of progressively-effective rollers for reducing the body portion of the blank; of a heading mechanism for upsetting one end of the blank, and comprising a clamping member; a transferring device for frictionally engaging and for positioning the blank relatively to the heading mechanism; a slide having a groove for receiving the body of the blank, and having a recess corresponding to the head portion of said blank.

41. In combination, rolls for reducing the wire or blank rod having portions which are non-effective thereon, a clamping device beyond the reducing-rolls, a feeding device for the wire, and means for intermittently operating it to carry the wire to the reducing action of the rolls and thereafter to be engaged by the clamping device, and a device arranged to sidewise embrace the blank, and means for endwise moving the same relatively to the clamping device.

42. The combination with rotatable rolls mounted in fixed journal-bearings constructed with peripheral threading die-faces, for threading the blank; of means for preliminarily rolling down and thereby diametrically reducing the blank at the part thereof which is subjected to the threading action of the said die-rolls, and means for rotating the die-rolls.

43. A pair of threading and reducing rolls, the threading-die of each roll occupying a portion of the circumference thereof, and the reducing-die occupying another portion of the circumference.

44. The combination, with wire-feeding means; a cutting device for severing the wire into blanks of predetermined length; and a series of progressively-effective rollers for reducing the body portion of the blank, said rollers having non-effective cut-away portions; of a heading mechanism, comprising a clamping member; a transferring device for frictionally engaging and positioning the blank relatively to the heading mechanism; a slide having a groove for receiving and straightening the body of the blank; a pair of threading-rollers for rolling a thread on said blank; and means for normally opening the straightening-slide for releasing the blank.

Signed by me at Springfield, Massachusetts, this 19th day of March, 1901.

GEO. T. WARWICK.

Witnesses:
WM. S. BELLOWS,
M. A. CAMPBELL.